(12) United States Patent
Yu et al.

(10) Patent No.: US 9,362,592 B2
(45) Date of Patent: Jun. 7, 2016

(54) METHOD OF PREPARING GEL POLYMER ELECTROLYTE SECONDARY BATTERY AND GEL POLYMER ELECTROLYTE SECONDARY BATTERY

(71) Applicant: LG CHEM, LTD., Seoul (KR)

(72) Inventors: Sung-Hoon Yu, Goyang-si (KR); Ho-Chun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/546,267

(22) Filed: Nov. 18, 2014

(65) Prior Publication Data

US 2015/0072245 A1    Mar. 12, 2015

Related U.S. Application Data

(63) Continuation of application No. 13/057,591, filed as application No. PCT/KR2009/004379 on Aug. 5, 2009, now Pat. No. 8,916,297.

(30) Foreign Application Priority Data

Aug. 5, 2008 (KR) .......................... 10-2008-0076571

(51) Int. Cl.
*H01M 10/0565* (2010.01)
*H01M 2/16* (2006.01)
(Continued)

(52) U.S. Cl.
CPC .......... *H01M 10/0565* (2013.01); *H01M 2/162* (2013.01); *H01M 2/1653* (2013.01);
(Continued)

(58) Field of Classification Search
CPC ................................................. H01M 10/0565
See application file for complete search history.

(56) References Cited

U.S. PATENT DOCUMENTS 8,603,382 B2 * 12/2013 Ogane ................ B29C 45/0055
                                                    264/297.2
8,916,297 B2 * 12/2014 Yu ...................... H01M 2/1653
                                                       29/623.1
(Continued)

FOREIGN PATENT DOCUMENTS

JP        2001-006740 A      1/2001
JP        2002-158037 A      5/2002
(Continued)

OTHER PUBLICATIONS

JP 2001-006740 MT.*

(Continued)

*Primary Examiner* — Patrick Ryan
*Assistant Examiner* — Alex Usyatinsky
(74) *Attorney, Agent, or Firm* — Birch, Stewart, Kolasch & Birch, LLP

(57) ABSTRACT

Provided are a method of preparing a gel polymer electrolyte secondary battery, and a gel polymer electrolyte secondary battery prepared by the method. The gel polymer electrolyte secondary battery includes a cathode, an anode, a separator and a gel polymer electrolyte in a battery case. The method includes (S1) coating a polymerization initiator on a surface of at least one selected from a group consisting of a cathode, an anode, a separator of a non-woven fabric, and a battery case, the surface needed to be contacted with a gel polymer electrolyte; (S2) putting an electrode assembly including the cathode, the anode, the separator of a non-woven fabric into the battery case; and (S3) forming a gel polymer electrolyte by introducing a gel polymer electrolyte composition including an electrolyte solvent, an electrolyte salt and a polymer electrolyte monomer into the battery case, and polymerizing the monomer.

9 Claims, 3 Drawing Sheets

(51) Int. Cl.
*H01M 4/04* (2006.01)
*H01M 4/13* (2010.01)
*H01M 4/133* (2010.01)
*H01M 4/139* (2010.01)
*H01M 10/052* (2010.01)
*H01M 4/131* (2010.01)
*H01M 4/62* (2006.01)
*H01M 10/04* (2006.01)
*H01M 10/054* (2010.01)

(52) U.S. Cl.
CPC ............ *H01M2/1686* (2013.01); *H01M 4/043* (2013.01); *H01M 4/0404* (2013.01); *H01M 4/13* (2013.01); *H01M 4/131* (2013.01); *H01M 4/133* (2013.01); *H01M 4/139* (2013.01); *H01M 4/623* (2013.01); *H01M 10/049* (2013.01); *H01M 10/0431* (2013.01); *H01M 10/052* (2013.01); *H01M 10/054* (2013.01); *H01M 2220/30* (2013.01); *H01M 2300/0085* (2013.01); *Y02E 60/122* (2013.01); *Y02P 70/54* (2015.11); *Y02T 10/7011* (2013.01); *Y10T 29/4911* (2015.01); *Y10T 29/49108* (2015.01); *Y10T 29/49115* (2015.01)

(56) References Cited

U.S. PATENT DOCUMENTS

| | | | | |
|---|---|---|---|---|
| 2002/0050054 A1* | 5/2002 | Noh | ................... | H01M 2/1686 29/623.3 |
| 2003/0027045 A1* | 2/2003 | Morigaki | ............... | H01M 4/622 429/217 |
| 2004/0157130 A1* | 8/2004 | Ohsawa | .................. | H01M 4/13 429/303 |
| 2009/0317723 A1* | 12/2009 | Yu | ..................... | H01M 10/0565 429/302 |

FOREIGN PATENT DOCUMENTS

| | | |
|---|---|---|
| JP | 2002-367677 A | 12/2002 |
| JP | 2003-059479 A | 2/2003 |
| JP | 2004-311114 A | 11/2004 |
| JP | 2005-38744 A | 2/2005 |
| JP | 2006-164752 A | 6/2006 |
| KR | 10-2008-0022677 A | 3/2008 |
| WO | WO 02/078114 A1 | 10/2002 |
| WO | WO 2008/030058 A1 | 3/2008 |

OTHER PUBLICATIONS

AUPO International Search Report, Appl. No. PCT/KR2009/004379, Feb. 4, 2011, pp. 1-3.

JP 2001-006740 MT (machine translation, in parent U.S. Appl. No. 13/057,591).

* cited by examiner

METHOD OF PREPARING GEL POLYMER ELECTROLYTE SECONDARY BATTERY AND GEL POLYMER ELECTROLYTE SECONDARY BATTERY

CROSS REFERENCE TO RELATED APPLICATIONS

This application is a Continuation of copending application Ser. No. 13/057,591, filed on Apr. 22, 2011, which was filed as PCT International Application No. PCT/KR2009/004379 on Aug. 5, 2009, which claims the benefit under 35 U.S.C. §119 (a) to Patent Application No. 10-2008-0076571, filed in Republic of Korea on Aug. 5, 2008, all of which are hereby expressly incorporated by reference into the present application.

TECHNICAL FIELD

The present invention relates to a method of preparing a gel polymer electrolyte secondary battery and a gel polymer electrolyte secondary battery prepared by the method. In particular, the present invention relates to a method of preparing a gel polymer electrolyte secondary battery with excellent stability and a high charging rate, and a gel polymer electrolyte secondary battery prepared by the method.

BACKGROUND ART

Recently, interests in energy storage technologies are increasing. As batteries are used in electric vehicles as well as in mobile phones, camcorders and notebook computers, research and development of the batteries grows briskly. An electrochemical battery is the field of attention in this aspect, and in particular, with a recent trend of miniaturization and light weight of electronic equipments, the electrochemical battery meets the demand for a rechargeable battery of small size, lightweight and high capacity.

The electrochemical battery or an electric double-layer capacitor primarily uses a liquid electrolyte, in particular, an ion-conducting organic liquid electrolyte, in which salt is dissolved in a non-aqueous organic solvent.

However, use of the liquid electrolyte increases the possibility that an electrode material may be deteriorated and an organic solvent may be volatilized, and threatens safety of a battery. For example, a battery may be burned out due to an increase in ambient temperature or temperature of the battery itself. In particular, in the case of a lithium secondary battery, gas is generated in the battery due to decomposition of a carbonate organic solvent and/or a reaction between an organic solvent and an electrode during charge/discharge, resulting in the expanded thickness of the battery. If the battery is stored at high temperature, this phenomenon is accelerated to further increase an amount of gas generation.

The continuously generated gas increases the internal pressure of the battery, and finally the battery of an angled shape is blown up in a specific direction and then a specific surface of the battery is deformed in the center. And, the gas makes a local difference of adhesion on an electrode surface in the battery, so that an electrode reaction does not occur uniformly over the entire electrode surface. As a result, the battery cannot avoid a reduction in performance and safety.

Generally, it is known that safety of a battery increases in the order of a liquid electrolyte, a gel polymer electrolyte and a solid polymer electrolyte, and performance of the battery decreases in such an order. Because the solid polymer electrolyte is poor in battery performance, batteries including the solid polymer electrolyte are not commercially produced.

Meanwhile, because the gel polymer electrolyte is excellent in electrochemical safety as mentioned above, the gel polymer electrolyte can uniformly maintain the thickness of a battery and ensure excellent adhesion with an electrode due to an intrinsic adhesive strength of a gel. A conventional method for manufacturing a battery using the gel polymer electrolyte includes the following two methods.

As one method, a polymerizable monomer and a polymerization initiator are added to a liquid electrolyte, in which salt is dissolved in a non-aqueous organic solvent, to prepare a composition. The composition is introduced into a battery case, in which a cathode, an anode and a separator are assembled in the type of roll or stack, and is gelled (crosslinked) under proper conditions of temperature and time, to manufacture a battery including a gel polymer electrolyte.

However, the above-mentioned method needs a separate process for maintaining the temperature required for gelation, resulting in loss of time and economical efficiency. And, according to composition of a polymerizable monomer or a polymerization initiator, gelation may occur at room temperature without heating, but it is a problem that the gelation may occur before introducing the composition including the polymerizable monomer, the polymerization initiator and the liquid electrolyte into the battery case.

As another conventional method, a polymerizable monomer and a polymerization initiator are added to a liquid electrolyte, in which salt is dissolved in a non-aqueous organic solvent, to prepare a composition. The composition is coated on a separator, and gelled using heat or UV. The separator is assembled with a cathode and an anode in a battery case to manufacture a battery. A liquid electrolyte is introduced into the battery.

However, this method needs a process of applying heat or UV for gelation, and the gel-coated separator absorbs water, resulting in deterioration in performance and stability of the battery.

Further, a polyethylene membrane that serves as a separator in the conventional art has a high thermal shrinkable rate, and thus, when temperature increases under conditions of abnormal use, a short circuit occurs between the cathode and the anode, resulting in reduction in stability of the battery.

DISCLOSURE OF INVENTION

Technical Problem

The object of the present invention is to provide a method of preparing a gel polymer secondary battery that has excellent stability, advantages in procedural time and economical efficiency, high productivity and improved performance due to a proper gelation of a gel polymer electrolyte composition, and a gel polymer secondary battery prepared by the method.

Technical Solution

To achieve the above-mentioned object, the present invention provides a method of preparing a gel polymer electrolyte secondary battery including a cathode, an anode, a separator and a gel polymer electrolyte in a battery case. The method includes (S1) coating a polymerization initiator on a surface of at least one selected from a group consisting of a cathode, an anode, a separator of a non-woven fabric and a battery case, the surface needed to be contacted with a gel polymer electrolyte; (S2) putting an electrode assembly including the cathode, the anode, the non-woven fabric separator into the battery case; and (S3) forming a gel polymer electrolyte by introducing a gel polymer electrolyte composition including an electrolyte solvent, an electrolyte salt and a polymer electrolyte monomer into the battery case and polymerizing the monomer.

The present invention also provides a method of preparing a gel polymer electrolyte secondary battery including a cathode, an anode, a separator and a gel polymer electrolyte in a battery case. The method includes (S1) manufacturing a cathode and an anode by adding a polymerization initiator to either a cathode slurry or an anode slurry or both of the slurries, the slurry including an electrode active material, a conductive material, a binder and a solvent, coating the resultant slurry on a current collector, pressing the slurry onto the current collector and drying the slurry; (S2) putting an electrode assembly including the cathode, the anode and a separator of a non-woven fabric into a battery case; and (S3) forming a gel polymer electrolyte by introducing a gel polymer electrolyte composition including an electrolyte solvent, an electrolyte salt and a polymer electrolyte monomer into the battery case and polymerizing the monomer.

The above-mentioned methods according to the present invention use a non-woven fabric separator to increase the economical efficiency, and separately introduces a polymerization initiator and a gel polymer monomer into a battery to efficiently control gelation according to positions of the polymerization initiator and the gel polymer monomer in the battery.

And, gel polymer electrolyte secondary batteries prepared by the methods use a non-woven fabric separator to provide high safety and performance due to efficient gelation.

Advantageous Effects

The present invention uses a separator formed from a non-woven fabric having a very low thermal shrinkable rate, and thus can increase stability at a high temperature atmosphere and reduce the manufacturing costs of a battery.

Further, the present invention does not use a mixture of a polymerization initiator and a polmerizable monomer, but makes a polymerization initiator and a polymerizable monomer mixed with each other after introducing a gel polymer electrolyte composition into a battery case. Accordingly, the present invention can accept a composition of a polymerization initiator and a polymerizable monomer that could not be used in a conventional way because gelation is initiated at room temperature.

In the case that gelation is initiated by polymerization at room temperature after introducing a gel polymer electrolyte composition into a battery case according to the present invention, it eliminates the need of heating or light radiation for gelation, thereby providing advantages in time and economical efficiency and solving the difference in performance of products caused by the difference in temperature between electrodes during heating.

When the polymerization initiator is contacted with the polymerizable monomer, a concentration gradient partially created therebetween increases, so that gelation occurs better, thereby improving a battery's performance.

BRIEF DESCRIPTION OF DRAWINGS

These and other features, aspects, and advantages of preferred embodiments of the present invention will be more fully described in the following detailed description, taken accompanying drawings. In the drawings.

MODE FOR THE INVENTION

Figure 1:
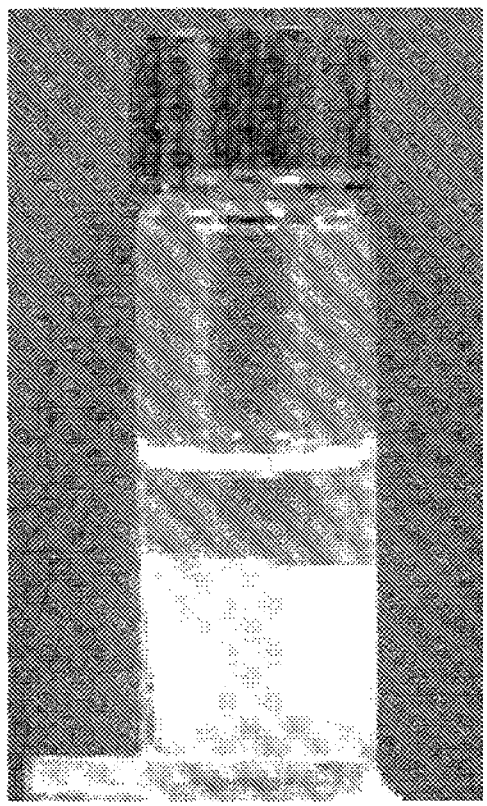
FIG. 1 is a photograph showing gelation at the time of putting a separator according to example 1 of the present invention into a gel polymer electrolyte composition according to example 1 of the present invention.

Hereinafter, the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

Generally, a conventional method of preparing a gel polymer electrolyte secondary battery uses a composition including a liquid electrolyte, in which an electrolyte salt is dissolved in a non-aqueous electrolyte solvent as mentioned above, a polymer monomer and a polymerization initiator. However, the composition may be gelled by polymerization at room temperature according to the composition of the components, and in such a case, makes it difficult to be introduced into a battery case.

However, a method of preparing a gel polymer electrolyte secondary battery according to the present invention does not simultaneously introduce a polymerization initiator and a polymer monomer into a battery case. That is, the present invention does not use a mixed composition including a liquid electrolyte, in which an electrolyte salt is dissolved in an electrolyte solvent, a polymer monomer and a polymerization initiator, but a gel polymer electrolyte composition including a polymer monomer and a liquid electrolyte, exclusive of a polymerization initiator. The polymerization initiator is contacted with the gel polymer electrolyte composition through a separate process. For example, the method of the present invention may coat a polymerization initiator on a surface of a cathode, an anode, a separator of a non-woven fabric and/or a battery case, that needs to be contacted with a gel polymer electrolyte, and introduce a gel polymer electrolyte composition including a polymer monomer into a battery case. Alternatively, the method may manufacture a cathode and/or an anode using an electrode slurry including a polymer initiator and introduce a gel polymer electrolyte composition including a polymer monomer into a battery case. Hereinafter, the method of the present invention is described in detail.

First, a polymerization initiator is coated on a side of at least one selected from the group consisting of a cathode, an anode, a separator of a non-woven fabric and a battery case, that needs to be contacted with a gel polymer electrolyte (S1).

In this case, the cathode and the anode can be manufactured by conventional methods known in the art. For example, an electrode active material is mixed with a solvent, and if necessary, a binder, a conductive material and a dispersant, and agitated to prepare an electrode slurry. The electrode slurry is coated on a current collector of a metal material, pressed onto the current collector and dried to manufacture an electrode.

The electrode active material may be a cathode active material or an anode active material.

The cathode active material may be lithium transition metal composite oxides (for example, lithium manganese composite oxide such as $LiMn_2O_4$, lithium nickel oxide such as $LiNiO_2$, lithium cobalt oxide such as $LiCoO_2$, oxides in which a portion of manganese, nickel and cobalt of the above-mentioned oxides is partially substituted for another transition metal, or lithium-containing vanadium oxide) such as $LiM_xO_y$(M=Co, Ni, Mn, $Co_aNi_bMn_c$) or chalcogenides (for example, manganese dioxide, titanium disulfide or molybdenum disulfide), however the present invention is not limited in this regard.

The anode active material may be a typical anode active material for an anode in a conventional electrochemical battery, for example lithium metals, lithium alloys, carbon, petroleum cokes, activated carbon, graphites or carbon fibers where lithium ions can be intercalated/deintercalated. The anode active material may be metal oxides, such as $TiO_2$ or $SnO_2$, that are capable of lithium intercalation/deintercalation and show a voltage of 2V or less in Li, however the present invention is not limited in this regard. In particular, carbon materials such as graphites, carbon fibers or activated carbon are preferable.

The current collector may be made from any metal that has a high conductivity, is easy to bond with an electrode slurry and does not react in the voltage range of a battery. A cathode current collector is made of for example, a foil of aluminum, nickel or combination thereof, and an anode current collector is made of, for example, a foil of copper, gold, nickel, copper alloys or combination thereof.

The battery case used in the present invention may be a typical battery case in the art. The battery case is not limited to a specific shape. For example, the battery case may have a cylindrical shape by use of a can, or an angled, pouch-like or coin-like shape.

The polymerization initiator is coated on a side of at least one selected from the group consisting of the electrode (a cathode, an anode) and the battery case that are manufactured as mentioned above, and a separator of a non-woven fabric that will be described later, wherein the side is to be contacted with a gel polymer electrolyte. A method for coating the polymerization initiator may be properly selected depending on the type of the polymerization initiator and a material to be coated. For example, a solution or suspension, in which the polymerization initiator is dissolved or dispersed in a proper solvent, may be applied on a material desired to be coated, however the present invention is not limited in this regard.

Alternatively, the polymerization initiator may be added to an electrode slurry. That is, the polymerization initiator is included in an electrode (a cathode and/or an anode). In this case, in a subsequent step for introducing a liquid electrolyte, the polymerization initiator included in the electrode is dissolved or dispersed in the liquid electrolyte, and is contacted with a polymer electrolyte monomer included in the liquid electrolyte. Thus, gelation is initiated in this way.

The polymerization initiator useful in the present invention may be, for example, organic peroxides or hydroperoxides such as benzoyl peroxide, acetyl peroxide, dilauryl peroxide, di-tert-butyl peroxide, t-butyl-peroxy-2-ethylhexanoate, cumyl hydroperoxide, t-amyl-(2-ethylhexyl)monoperoxy carbonate or hydrogen peroxide, and azo compounds such as 2,2'-azobis(2-cyanobutane), 2,2'-azobis(metbylbutyronitrile), AIBN(2,2'-azobis(iso-butyronitrile) or AMVN(2,2'-azobisdimethyl-valeronitrile), or mixtures thereof, however the present invention is not limited in this regard.

The polymerization initiator is decomposed in the battery by heat of, for example, 30 to 100° C., or at room temperature (5 to 30° C.) to form radicals. The polymerization initiator reacts with the polymer electrolyte monomer by free radical polymerization to form a gel polymer electrolyte.

The polymerization initiator may be included in an amount of 0.01 to 5 parts by weight based on 100 parts by weight of a mixture of an electrolyte solvent and an electrolyte salt to be described later. If the polymerization initiator is included more than 5 parts by weight, gelation occurs early in the middle of introducing a gel polymer electrolyte composition into a battery case, or a non-reacted initiator remains, which exerts a bad influence on the battery performance later. On the contrary, if the polymerization initiator is included less than 0.01 parts by weight, gelation does not occur properly.

Next, an electrode assembly including the cathode, the anode and a separator of a non-woven fabric are putted into the battery case (S2).

The non-woven fabric has a very low thermal shrinkage, and thus it hardly shrinks by heat. Accordingly, when the non-woven fabric is used as a separator like the present invention, although the temperature of a battery increases, there is little possibility that a short circuit occurs between a cathode and an anode, resulting in improved stability of the battery.

However, a separator of a non-woven fabric has relatively large voids, and thus, the surfaces of a cathode and an anode may be partially contacted with each other through the large voids. In the case of a lithium secondary battery, Li dendrite is generated due to movement of an excessive amount of lithium ions, resulting in formation of a micro-short circuit. The macro-short circuit causes an incomplete charge of a battery, resulting in reduction in performance of the battery.

However, the present invention uses a gel polymer electrolyte as mentioned above, and thus can overcome the above-mentioned drawbacks. Further, the present invention coats a polymerization initiator on a desired portion or includes a polymerization initiator in an electrode, and thus can induce an efficient gelation and ultimately prevent reduction of battery performance.

The separator of a non-woven fabric according to the present invention may be formed using polyolefin-based fibers, such as polyethylene or polypropylene, that are typically used in the prior art, however the present invention is not limited in this regard.

A method for producing the non-woven fabric may be properly selected from methods known in the art according to necessity, and may include, for example, chemical bonding, thermal bonding, airlaid, wet-lay, needlepunching, spunlace, spun bond, melt blown, stitch bond or electrospinning, however the present invention is not limited in this regard.

A method for applying the separator in a battery may include winding as a typical method, lamination, stack, folding and so on.

Next, a gel polymer electrolyte is formed by introducing a gel polymer electrolyte composition including an electrolyte solvent, an electrolyte salt and a polymer electrolyte monomer into the battery case, and polymerizing the monomer (S3).

When the gel polymer electrolyte composition including the polymer electrolyte monomer is introduced into the battery case, the monomer contacts the polymerization initiator in the battery case. Polymerization initiates gelation to form a gel polymer electrolyte.

At this time, gelation depends more on an amount of the polymerization initiator than an amount of the polymer electrolyte monomer. That is, for better gelation, it is more effective to double an amount of the polymerization initiator than to double an amount of the polymer electrolyte monomer. However, if the polymerization initiator remains dissolved in an electrolyte solvent, activity of the polymerization initiator reduces as time goes by. Thus, the present invention coats the polymerization initiator on an electrode, a separator or a battery case that is to be contacted with a gel polymer electrolyte, or includes the polymerization initiator in an electrode, thereby improving the sustenance of the polymerization initiator.

Meanwhile, in the case that the polymer electrolyte monomer is already included in a cathode, an anode or a separator, a dense gel is formed at a site where the polymer electrolyte monomer was included, and consequently, movement of lithium ions may be obstructed. For example, in the case that the polymer electrolyte monomer is coated on a separator, preferably gelation should occur after the polymer electrolyte monomer is dissolved and uniformly dispersed in a battery by a gel polymer electrolyte composition that is subsequently introduced into the battery. If not so, a dense gelation may occur merely near the separator. In the present invention, however, a polymerization initiator is already included in a cathode, an anode or a separator, and thus the monomer can be polymerized at a uniform concentration throughout a battery, thereby avoiding this problem.

As mentioned above, according to the present invention, the polymerization initiator and the polymer electrolyte monomer are mixed not before, introducing the gel polymer electrolyte composition into the battery case, but after introducing the gel polymer electrolyte composition into the battery case. When the polymerization initiator and the polymer electrolyte monomer are mixed with each other, gelation is initiated by polymerization at room temperature. Thus, the present invention can accept a composition that is difficult to be introduced into a battery case.

And, when a gel polymer electrolyte composition is introduced into a battery case according to the present invention and then gelation is initiated by polymerization at room temperature, heating or light radiation for gelation is not necessarily required, thereby gaining advantages in economical efficiency and time and reducing the difference in performance between products caused by the difference in temperature between batteries that may occur during heating. If necessary, heating or light radiation may be further performed to effectively promote or induce gelation.

In the meanwhile, conventionally, a liquid electrolyte, a polymerization initiator and a polymer electrolyte monomer are already mixed before introducing into a battery case. However, according to the present invention, a liquid electrolyte, a polymerization initiator and a polymer electrolyte monomer are mixed after introducing into a battery case, and thus, when the polymerization initiator is contacted with the polymer electrolyte monomer, a concentration gradient is partially created between the polymerization initiator and the polymer electrolyte monomer, and increases. Accordingly, gelation occurs better, and a battery's performance can be improved.

For example, in a conventional art, when a composition including 5 weight % of a polymer electrolyte monomer and 0.03 weight % of a polymerization initiator is introduced into a battery case, concentrations of the polymer electrolyte monomer and the polymerization initiator are maintained throughout a battery. However, in the case that a polymerization initiator is coated on a separator according to an embodiment of the present invention, when a gel polymer electrolyte composition including a polymer electrolyte monomer, not including a polymerization initiator is introduced into a battery case, although concentrations of the polymer electrolyte monomer and the polymerization initiator are 5 weight % and 0.03 weight %, respectively, like the above conventional art, the concentration of the polymerization initiator contacted with the polymer electrolyte monomer near the separator becomes higher than the actual concentration. As a result, gelation occurs better, and consequently the battery performance can be improved.

In the present invention, the polymer electrolyte monomer is not limited to a specific material if it is capable of polymerization, and may be preferably a compound having a polymerizable functional group selected from the group consisting of a vinyl group, an epoxy group, an allyl group and a (meth)acryl group. And, in the case that at least two polymerizable functional groups are in the polymer electrolyte monomer, the polymerizable functional groups may be the same or different from each other.

For example, the polymer electrolyte monomer may be tetraethylene glycol diacrylate, poly ethylene glycol diacrylate (molecular weight: 50 to 20,000), 1,4-butanediol diacrylate, 1,6-hexandiol diacrylate, trimethylolpropane triacrylate, trimethylolpropane ethoxylate triacrylate, trimethylolpropane propoxylate triacrylate, ditrimethylolpropane tetraacylate, pentaerythritol tetraacrylate, pentaerythritol ethoxylate tetraacrylate, dipentaerythritol pentaacrylate, dipentaerythritol hexaacrylate, polyethylene glycol) diglycidyl ether, 1,5-hexadiene diepoxide, glycerol propoxylate triglycidyl ether, vinylcyclohexene dioxide, 1,2,7,8-diepoxyoctane, 4-vinylcyclohexene dioxide, butyl glycidyl ether, diglycidyl 1,2-cyclohexandicarboxylate, ethylene glycol diglycidyl ether, glycerol triglycidyl ether or glycidyl methacrylate, singularly or in combination thereof, however the present invention is not limited in this regard.

And, the polymer electrolyte monomer may be used in an amount of 0.01 to 10 parts by weight based on 100 parts by weight of a mixture of an electrolyte solvent and an electrolyte salt. If the polymer electrolyte monomer is used more than 10 parts by weight, gelation occurs early in the middle of introducing a gel polymer electrolyte composition into a battery case or gelation becomes excessively dense to form a gel of a large resistance. On the contrary, if the polymer electrolyte monomer is used less than 0.01 parts by weight, gelation does not occur properly.

In the present invention, the electrolyte solvent is used to dissolve or dissociate an electrolyte salt. The electrolyte solvent is not limited to a specific material, and may be any electrolyte solvent for a typical battery, for example, cyclic carbonate, linear carbonate, lactone, ether, ester, sulfoxide, acetonitrile, lactam, ketone or halogen derivatives thereof, singularly or in combination thereof.

The exemplary cyclic carbonate is ethylene carbonate (EC), propylene carbonate (PC), butylene carbonate (BC) or fluoroethylene carbonate (FEC), the exemplary linear carbonate is diethyl carbonate (DEC), dimethyl carbonate (DMC), dipropyl carbonate (DPC), ethyl methyl carbonate (EMC) or methyl propyl carbonate (MPC). The exemplary lactone is gamma-butyrolactone (GBL), and the exemplary ether is dibutyl ether, tetrahydrofuran, 2-methyltetrahydrofuran, 1,4-dioxane, 1,2-dimethoxy ethane or 1,2-diethoxy ethane. The exemplary ester is methyl formate, ethyl formate, propyl formate, methyl acetate, ethyl acetate, propyl acetate, methyl propionate, ethyl propionate, butyl propionate or methyl pivalate. And, the exemplary sulfoxide is dimethylsulfoxide, the exemplary lactam is N-methyl-2-pyrrolidone (NMP), and the exemplary ketone is polymethylvinyl ketone. And, halogen derivatives of the exemplary electrolyte solvents may be used. The present invention is not limited to the exemplary electrolyte solvent. And, the exemplary electrolyte solvents may be used singularly or in combination thereof.

The electrolyte salt is not limited to a specific material, and may be any electrolyte salt for a typical secondary battery. For example, the electrolyte set may be a combination of (i) a positive on selected from the group consisting of $Li^+$, $Na^+$ and $K^+$, and (ii) a negative ion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$ and $C(CF_2SO_2)_3^-$, however the present invention is not limited in this regard. The exemplary electrolyte salts may be used singularly or in combination thereof. In particular, a lithium salt is a preferable electrolyte salt.

Optionally, the gel polymer electrolyte composition according to the present invention may further include additives that are well known in the art.

In the present invention, gelation initiated by polymerization may be performed through thermal polymerization or at room temperature (5 to 30° C.). At this time, a polymerization time may be about 10 to about 12 minutes and a thermal polymerization temperature may be 30 to 100° C.

In the present invention, gelation initiated by polymerization is preferably performed under an inert condition. The polymerization under an inert condition fundamentally prevents the reaction between radicals and oxygen in the air that acts as a radical extinguisher and increases the extent of reaction such that a non-reacted polymer electrolyte monomer hardly exists. Thus, it can prevent reduction in charge/discharge capability caused by a great amount of non-reacted monomers remaining in a battery.

The inert atmosphere condition may use gas of low reactivity that is known in the art, in particular, at least one inert gas selected from the group consisting of nitrogen, argon, helium and xenon.

In this way, the gelation initiated by polymerization forms a gel polymer electrolyte. Specifically, a gel polymer of crosslinked polymer electrolyte monomers is formed through polymerization, and a liquid electrolyte including an electrolyte salt dissociated in an electrolyte solvent may be uniformly impregnated in the gel polymer.

In the present invention, a secondary battery is preferably a lithium secondary battery, for example a lithium metal secondary battery, a lithium ion secondary battery, a lithium polymer secondary battery or a lithium ion polymer secondary battery.

Hereinafter, the present invention is described in detail through the examples. However, it should be understood that the detailed description and specific examples, while indicating preferred embodiments of the invention, are given by way of illustration only, since various changes and modifications within the spirit and scope of the invention will become apparent to those skilled in the art from this detailed description.

Example 1

Manufacture of a Separator Coated with a Polymerization Initiator

A solution, in which 0.00825 g of t-butyl peroxy-2-ethylhexanoate as a polymerization initiator is dissolved in acetone, was uniformly coated on a polyolefin-based non-woven fabric separator, and dried to manufacture a separator coated with the polymerization initiator.

<Preparation of a Gel Polymer Electrolyte Composition>

1M $LiPF_6$ was dissolved in a non-aqueous electrolyte solvent having a composition ratio of ethylene carbonate (EC):ethylmethylcarbonate (EMC)=1:2(v:v) to prepare a liquid electrolyte. 5 parts by weight of trimethylolpropane triacrylate as a polymer electrolyte monomer was added based on 100 parts by weight of the liquid electrolyte to prepare 3.30 g of a gel polymer electrolyte composition.

<Manufacture of a Secondary Battery>

94 weight % of $LiCoO_2$ as a cathode active material, 3 weight % of carbon black as a conductive material and 3 weight % of PVdF as a binder were added to N-methyl-2-pyrrolidone (NMP) as a solvent to prepare a cathode slurry. The cathode slurry was coated on an Al thin foil of a cathode current collector having a thickness of about 20 μm, dried and mil-pressed to a manufacture a cathode.

96 weight % of carbon powder as an anode active material, 3 weight % of PVdF as a binder and 1 weight % of carbon black as a conductive material were added to NMP as a solvent to prepare an anode slurry. The anode slurry was coated on a Cu thin foil of an anode current collector having a thickness of 10 μm, dried and roll-pressed to manufacture an anode.

The separator coated with the polymerization initiator and the gel polymer electrolyte composition were provided.

The separator was interposed between the cathode and the anode, and the battery elements were rolled in a jelly roll fashion several times and putted into a battery case. The gel polymer electrolyte composition was introduced into the battery case to manufacture a secondary battery.

Example 2

A secondary battery was manufactured by the same method as example 1, except that dipentaerythritol pentaacrylate was used as a polymer electrolyte monomer, instead of trimethylolpropane triacrylate.

Example 3

A secondary battery was manufactured by the same method as example 1, except that t-butyl peroxy-2-ethylhexanoate as a polymerization initiator was used in an amount of 0.0165 g, not in an amount of 0.00825 g, trimethylolpropane triacrylate as a polymer electrolyte monomer was used in an amount of 8 parts by weight, not in an amount of 5 parts by weight and after a gel polymer electrolyte composition was introduced into a battery case, it was polymerized at 80° C. for 4 hours under a nitrogen atmosphere.

Example 4

95 weight % of carbon powder as an anode active material, 3 weight % of PVdF as a binder, 1 weight % of carbon black as a conductive material and 1 weight % of t-amyl-(2-ethylhexyl)monoperoxycarbonate as a polymerization initiator were added to NMP as a solvent to prepare an anode slurry. The anode slurry was coated on a Cu thin foil of an anode current collector having a thickness of 10 μm, dried and roll-pressed to manufacture an anode. Preferably, the anode slurry was dried at low temperature and high pressure as soon as possible.

A polyolefin-based non-woven fabric separator was interposed between the above-mentioned anode and the cathode manufactured in example 1, and the battery elements were rolled in a jelly roll fashion several times and putted into a battery case. The gel polymer electrolyte composition prepared in example 1 was introduced into the battery case to manufacture a secondary battery.

Comparative Example 1

1M $LiPF_6$ was dissolved in a non-aqueous electrolyte solvent having a composition ratio of ethylene carbonate (EC):

dimethylcarbonate (DMC):diethylcarbonate(DEC)=4:3:3 to prepare an solution. 1.5 parts by weight of vinylene carbonate and 0.5 parts by weight of 1,3-propane sultone were added based on 100 parts by weight of the solution to prepare 3.30 g of a liquid electrolyte.

The liquid electrolyte was introduced into a battery case, in which a general polyolefin-based separator and the cathode and anode manufactured in example 1 were assembled, to manufacture a secondary battery.

Comparative Example 2

1M $LiPF_6$ was dissolved in a non-aqueous electrolyte solvent having a composition ratio of ethylene carbonate (EC): propylenecarbonate (PC):diethylcarbonate(DEC)=3:2:5 to prepare 3.30 g of a liquid electrolyte.

The liquid electrolyte was introduced into a battery case, in which a general polyolefin-based separator and the cathode and anode manufactured in example 1 were assembled, to manufacture a secondary battery.

Comparative Example 3

1M $LiPF_6$ was dissolved in a non-aqueous electrolyte solvent having a composition ratio of ethylene carbonate (EC): ethylmethylcarbonate (EMC)=1:2(v:v) to prepare a liquid electrolyte. 5 parts by weight of trimethylolpropane triacrylate as a polymer electrolyte monomer and 0.25 parts by weight of t-butyl peroxy-2-ethylhexanoate as a polymerization initiator were added based on 100 parts by weight of the liquid electrolyte to prepare 3.30 g of a gel polymer electrolyte composition.

The gel polymer electrolyte composition was coated on a polyolefin-based non-woven separator and dried to manufacture a separator.

The separator was interposed between the cathode and anode manufactured in example 1, and the battery elements were rolled in a jelly roll fashion several times and putted into a battery case. The gel polymer electrolyte composition was introduced into the battery case to manufacture a secondary battery.

Comparative Example 4

1M $LiPF_6$ was dissolved in a non-aqueous electrolyte solvent having a composition ratio of ethylene carbonate (EC): ethylmethylcarbonate (EMC)=1:2(v:v) to prepare a liquid electrolyte. 5 parts by weight of trimethylolpropane triacrylate as a polymer electrolyte monomer and 0.25 parts by weight of t-butyl peroxy-2-ethylhexanoate as a polymerization initiator were added based on 100 parts by weight of the liquid electrolyte to prepare 3.30 g of a gel polymer electrolyte composition.

A general polyolefin-based separator was interposed between the cathode and anode manufactured in example 1, and the battery elements were rolled in a jelly roll fashion several times and putted into a battery case. Because the gel polymer electrolyte composition is gelled at room temperature within 1 hour, the gel polymer electrolyte composition was introduced into the battery case within the allowable time for introduction into the battery case, thereby manufacturing a secondary battery.

Comparative Example 5

A solution, in which 0.165 g of trimethylolpropane triacrylate as a polymer electrolyte monomer is dissolved in acetone, was uniformly coated on a polyolefin-based non-woven fabric separator, and dried to manufacture a separator.

1M $LiPF_6$ was dissolved in a non-aqueous electrolyte solvent having a composition ratio of ethylene carbonate (EC): ethylmethylcarbonate (EMC)=1:2(v:v) to prepare a liquid electrolyte. 0.25 parts by weight of t-butyl peroxy-2-ethylhexanoate as a polymerization initiator was added based on 100 parts by weight of the liquid electrolyte to prepare 3.30 g of a gel polymer electrolyte composition.

The separator was interposed between the cathode and anode manufactured in example 1, and the battery elements were rolled in a jelly roll fashion several times and putted into a battery case. The gel polymer electrolyte composition was introduced into the battery case to manufacture a secondary battery.

Experimental Example

1. Gelation Test

A gelation test was performed using the separator and the gel polymer electrolyte composition that were manufactured in example 1. Specifically, the separator was putted into the gel polymer electrolyte composition, and gelation with time was calculated according to the below-mentioned math FIG. 1, of which results are shown in the below-mentioned table 1.

MathFigure 1

$$\text{GELATION WITH TIME (\%)} = (\text{GELLED HEIGHT}/\text{TOTAL HEIGHT OF SOLUTION}) \times 100 \quad [\text{Math.1}]$$

TABLE 1

| Time | 20 minutes | 40 minutes | 60 minutes | 90 minutes |
|---|---|---|---|---|
| Gelation | 10% | 85% | 100% | 100% |

According to the above-mentioned table 1, it was found that gelation completed within 1 hour from its start.

Figure 2:
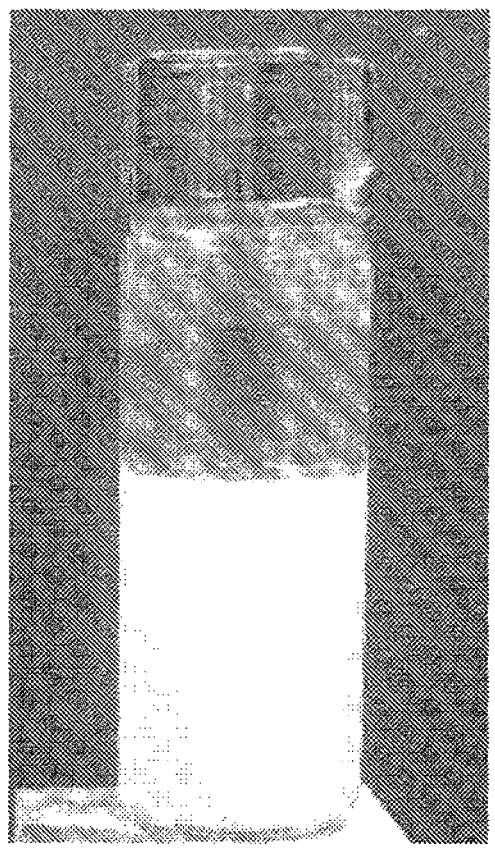
FIG. 2 is a photograph showing gelation in one hour after putting a separator according to example 1 of the present invention into a gel polymer electrolyte composition according to example 1 of the present invention.

FIG. 1 is a photograph showing gelation at the time of putting a separator coated with a polymerization initiator, manufactured in example 1, into a gel polymer electrolyte composition prepared in example 1. FIG. 2 is a photograph showing gelation in one hour after putting the separator into the gel polymer electrolyte composition. In FIG. 1, as gelation did not occur, the composition was not turbid, and in FIG. 2, as gelation proceeded considerably, the composition was very turbid.

Therefore, it can be seen that gelation proceeded using the separator coated with a polymerization initiator and the gel polymer electrolyte composition according to the present invention to form a gel polymer electrolyte.

Figure 3:
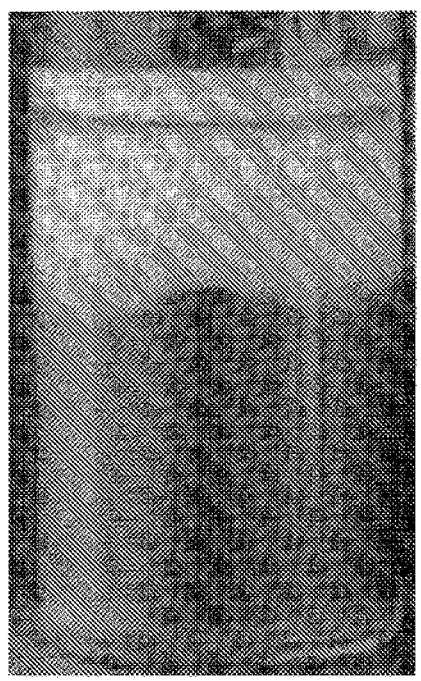
FIG. 3 is a photograph showing gelation in four hours after putting an anode according to example 4 of the present invention into a gel polymer electrolyte composition according to example 1 of the present invention.

And, the anode of example 4 manufactured from the anode slurry including the polymerization initiator was putted into the gel polymer electrolyte composition prepared in example 1 and polymerized at 90° C. for 4 hours under a nitrogen atmosphere to form a gel, which is shown in FIG. 3. It was can be seen that gelation proceeded considerably.

2. Performance Measurement of a Secondary Battery

The secondary batteries manufactured in examples 1 to 3 and comparative examples 1 to 5 were each charged/discharged at 0.2 C at room temperature. The discharge capacity and capacity retention were shown in the below-mentioned table 2. In table 2, capacity means a discharge capacity after 50 cycles, and capacity retention means a percentage value of capacity after 50 cycles to initial discharge capacity.

TABLE 2

|  | Capacity(mAh) | Capacity retention(%) after 50 cycles based on initial capacity |
| --- | --- | --- |
| Example 1 | 718 | 94 |
| Example 2 | 726 | 92 |
| Example 3 | 712 | 91 |
| Comparative example 1 | 708 | 88 |
| Comparative example 2 | 703 | 86 |
| Comparative example 3 | 670 | 72 |
| Comparative example 4 | 688 | 77 |
| Comparative example 5 | 663 | 63 |

Referring to the above-mentioned table 2, it was found that the batteries manufactured in examples 1 to 3 had an improvement in discharge capacity and capacity retention after 50 cycles when compared with those manufactured in comparative examples 1 to 5. In particular, the batteries manufactured in comparative examples 3 to 5 used a gel polymer electrolyte including a polymerization initiator and a polymer electrolyte monomer dissimilarly from the present invention, and had a significant reduction in performance when compared with those manufactured in examples 1 to 3.

Therefore, it is found that the secondary battery according to the present invention can include a gel polymer electrolyte formed by a proper gelation, and thus have the improved performance.

What is claimed:

1. A method of preparing a gel polymer electrolyte secondary battery including a cathode, an anode, a separator and a gel polymer electrolyte in a battery case, the method comprising:
   (S1) coating a polymerization initiator on a surface of a cathode and/or anode, the surface needed to be contacted with a gel polymer electrolyte;
   (S2) putting an electrode assembly including the cathode, the anode, the non-woven fabric separator into the battery case; and
   (S3) forming a gel polymer electrolyte by introducing a gel polymer electrolyte composition including an electrolyte solvent, an electrolyte salt and a polymer electrolyte monomer into the battery case and polymerizing the monomer,
   wherein the electrode has no polymerization initiators, and wherein the electrode is produced by coating, pressing and drying a slurry for the cathode and/or anode, said slurry consisting of an electrode active material, binder, conductive material and solvent.

2. The method of preparing a gel polymer electrolyte secondary battery according to claim 1,
   wherein the polymerization initiator is at least one selected from the group consisting of benzoyl peroxide, acetyl peroxide, dilauryl peroxide, di-tert-butyl peroxide, t-butyl-peroxy-2-ethylhexanoate, cumyl hydroperoxide, t-amyl-(2-ethylhexyl)monoperoxy carbonate, hydrogen peroxide, 2,2'-azobis(2-cyanobutane), 2,2'-azobis(methylbutyronitrile), AIBN and AMVN.

3. The method of preparing a gel polymer electrolyte secondary battery according to claim 1,
   wherein the polymer electrolyte monomer is a monomer having a polymerizable functional group selected from the group consisting of a vinyl group, an epoxy group, an allyl group and a (meth)acryl group.

4. The method of preparing a gel polymer electrolyte secondary battery according to claim 1,
   wherein the electrolyte solvent is at least one selected from the group consisting of cyclic carbonate, linear carbonate, lactone, ether, ester, sulfoxide, acetonitrile, lactam, ketone and halogen derivatives thereof.

5. The method of preparing a gel polymer electrolyte secondary battery according to claim 1,
   wherein the electrolyte salt is a combination of (i) a positive ion selected from the group consisting of $Li^+$, $Na^+$ and $K^+$, and (ii) a negative ion selected from the group consisting of $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$ and $C(CF_2SO_2)_3^-$.

6. The method of preparing a gel polymer electrolyte secondary battery according to claim 1,
   wherein the monomer is included in an amount of 0.01 to 10 parts by weight based on 100 parts by weight of a mixture of the electrolyte solvent and the electrolyte salt.

7. The method of preparing a gel polymer electrolyte secondary battery according to claim 1,
   wherein the polymerization initiator is included in an amount of 0.01 to 5 parts by weight based on 100 parts by weight of a mixture of the electrolyte solvent and the electrolyte salt.

8. The method of preparing a gel polymer electrolyte secondary battery according to claim 1, further comprising performing thermal treatment or light radiation in the polymerization of the monomer.

9. A gel polymer electrolyte secondary battery prepared according to claim 1.

* * * * *